US012608992B2

(12) United States Patent
Liu et al.

(10) Patent No.: US 12,608,992 B2
(45) Date of Patent: Apr. 21, 2026

(54) BILL BINDING AND ENCODING DEVICE AND A CLASSIFICATION FILING SYSTEM

(71) Applicant: Hubei University of Arts and Science, Xiangyang (CN)

(72) Inventors: Ke Liu, Xiangyang (CN); Jing Cao, Xiangyang (CN); Zhicheng Zhong, Xiangyang (CN); Xingchen Liu, Xiangyang (CN); Wangnan Li, Xiangyang (CN)

(73) Assignee: Hubei University of Arts and Science, Xiangyang (CN)

( * ) Notice: Subject to any disclaimer, the term of this patent is extended or adjusted under 35 U.S.C. 154(b) by 761 days.

(21) Appl. No.: 17/982,791

(22) Filed: Nov. 8, 2022

(65) Prior Publication Data

US 2023/0169814 A1     Jun. 1, 2023

(51) Int. Cl.
   *B42C 9/02*            (2006.01)
   *B42C 9/00*            (2006.01)
   *G06Q 10/0875*     (2023.01)
   *G07D 11/125*      (2019.01)

(52) U.S. Cl.
   CPC .......... *G07D 11/125* (2019.01); *B42C 9/0062* (2013.01); *B42C 9/0068* (2013.01); *B42C 9/02* (2013.01); *B42C 9/025* (2013.01); *G06Q 10/0875* (2013.01); *B65H 2301/43821* (2013.01)

(58) Field of Classification Search
   CPC ......... B42C 9/02; B42C 9/025; B42C 9/0062; B42C 9/0068; B65H 2301/43821; B42P 2241/04; B29C 63/04

USPC ........................ 412/33, 34, 36; 156/216, 479
See application file for complete search history.

(56) References Cited

U.S. PATENT DOCUMENTS

| | | | | |
|---|---|---|---|---|
| 619,870 | A | * | 2/1899 | Crowell ................ B42C 9/0068 |
| | | | | 156/538 |
| 4,491,492 | A | * | 1/1985 | Hetherington .......... G03F 7/161 |
| | | | | 156/212 |
| 5,180,461 | A | * | 1/1993 | Widmann ................ B42F 21/04 |
| | | | | 156/464 |
| 5,279,698 | A | * | 1/1994 | Davis ........................ B42B 5/04 |
| | | | | 156/542 |

(Continued)

FOREIGN PATENT DOCUMENTS

| | | | | |
|---|---|---|---|---|
| CA | 1075558 | A | * | 4/1980 |
| DE | 2456341 | A1 | * | 8/1976 |

(Continued)

*Primary Examiner* — Kyle R Grabowski

(57) ABSTRACT

The invention relates to the technical field of bill management, in particular to a bill binding and encoding device and a classification filing system, wherein the bill binding and encoding device comprises: a bottom plate, a movable encoding mechanism and ink ribbon spools; wherein a sliding rail is provided on the bottom plate; a positioning rack is provided on one side of the sliding rail, and a plurality of positioning teeth are provided on the positioning rack along the length direction of the sliding rail; the sliding block is provided with a positioning claw which is provided in rotational connection with the sliding block through a rotating shaft; and a encoding groove is provided on the one side of the sliding groove, and the length direction of the encoding groove is parallel to the length direction of the sliding rail.

10 Claims, 8 Drawing Sheets

(56)     References Cited

U.S. PATENT DOCUMENTS

| 5,876,131 | A | * | 3/1999 | Parker | ..................... | B41J 3/407 |
| | | | | | | 400/279 |
| 5,980,676 | A | * | 11/1999 | Meetze | ................. | B65H 83/02 |
| | | | | | | 156/247 |
| 7,789,383 | B2 | * | 9/2010 | Grizzell | ............... | B25C 5/0235 |
| | | | | | | 270/58.11 |
| 2006/0266872 | A1 | * | 11/2006 | Parker | ................. | B65H 35/006 |
| | | | | | | 428/343 |
| 2009/0279986 | A1 | * | 11/2009 | Rogalski, Jr. | ......... | B42C 9/0062 |
| | | | | | | 222/156 |
| 2013/0280484 | A1 | * | 10/2013 | Honegger | ................ | B42F 1/00 |
| | | | | | | 428/189 |

FOREIGN PATENT DOCUMENTS

| DE | 1020130044971 | | * | 9/2014 |
| FR | 1391263 | A | * | 3/1965 |

* cited by examiner

BILL BINDING AND ENCODING DEVICE AND A CLASSIFICATION FILING SYSTEM

1. TECHNICAL FIELD

The invention relates to the technical field of bill management, in particular to a bill binding and encoding device and a classification filing system.

2. BACKGROUND ART

The various types of bills are essential for the operation of today's social organizations, accompanying the life cycle of each organization from its emergence to its dissolution, and serving as important documents of proof or for inspection by the relevant authorities at the required time.

For every organization, especially those with frequent social activities, there emerge a large number of bills and the storage and management of these bills is a time-consuming task. The existing bill management usually binds the same type of bills for a period of time such as one month, and then places the same type of bills of different time periods after binding into a book, with arranging them in chronological order for easy subsequent search and management.

However, by adopting such bill management method, it is easy to disrupt the chronological order after taking out and putting back the bill book several times when looking for the required bills, resulting in frequent inaccuracies in the subsequent search by chronological order and confirmation requirement by looking up the contents of the bill book, which leads to a lot of time waste for each bill search.

For organizations with frequent social activities, it is even more troublesome to search for bills each time as they have more bills.

3. SUMMARY OF THE INVENTION

To solve the above problems and achieve the above object, the invention provides the following technical solutions:

The invention provides a bill binding and encoding device, comprising: the bottom plate, the movable encoding mechanism and the ink ribbon spools, wherein the sliding rail is provided on the bottom plate, the movable encoding mechanism is provided with the sliding block, and the sliding block is provided in the sliding rail;

Wherein the positioning rack is provided on one side of the sliding rail, and a plurality of positioning teeth are provided on the positioning rack along the length direction of the sliding rail;

Wherein the sliding block is provided with the positioning claw which is provided in rotational connection with the sliding block through the rotating shaft;

The positioning claw is provided with a hook part which is respectively buckled and positioned with the positioning teeth of the positioning rack;

The encoding groove is provided on the one side of the sliding groove, and the length direction of the encoding groove is parallel to the length direction of the sliding rail;

The contact plate is provided in the encoding groove, and the supporting spring is provided between the contact plate and the bottom plate of the encoding groove;

One side of the sliding block is provided with the connecting plate and the connecting plate passes through the lower part of the bottom plate of the encoding groove;

One end of the connecting plate, which is far away from the sliding block, is provided with an installation cylinder for installing the ink ribbon spools, and the axis of the installation cylinder is parallel to the length direction of the encoding groove.

Further, the shift spring is provided between one end face of the sliding block and one end face of the sliding rail, and the shift spring always remained in the compressed state;

The limiting rack is provided on the other side of the sliding rail relative to the positioning rack, and the limiting rack is provided with a plurality of limiting teeth along the length of the sliding rail;

The limiting teeth and the positioning rack are provided in a staggered position in the length direction of the slide.

The limiting claw is also provided on the rotating shaft, and the limiting claw is provided with a hook part which is respectively buckled and limited with the limiting teeth of the limiting rack;

The rotating shaft is provided with a positioning spring in a penetrating mode, wherein one end of the positioning spring is fixed relative to the rotating shaft and the other end of the positioning spring is fixed to the positioning claw, wherein the positioning spring provides a force for the positioning claw to rotate towards the side of the positioning rack;

The limiting spring is further provided on the rotating shaft in a penetrating mode, one end of the limiting spring is connected with the positioning claw, the other end of the limiting spring is connected with the limiting claw, and the limiting spring provides a force for the limiting claw to rotate towards one side of the limiting rack;

The positioning claw is also provided with a limiting strip at one side close to the limiting claw in the axis direction of the rotating shaft, wherein the corresponding limiting claw is provided with a limiting protrusion, and the limiting protrusion is provided at one side close to the limiting claw of the vertical axis of the rotating shaft, and the limiting strip is provided at one side close to the positioning claw, of the vertical axis of the rotating shaft;

The positioning teeth and the limiting teeth are both provided in a sawtooth shape, and the sawtooth-shaped tooth tips are provided towards the end face of the sliding rail on one side of the shift spring;

The control block is provided fixedly at one end of the rotating shaft away from the sliding block.

Further, the movable encoding mechanism further comprises the shift control assembly, and the shift control assembly is provided on the control block, and the shift control assembly comprises a single-step moving assembly and a multi-step moving assembly;

The single-step moving assembly is provided above one side close to the positioning rack of the positioning claw and is provided with an inclined plane pushing block, and the inclined plane of the inclined plane pushing block inclines towards one side of the limiting rack;

The press strip extending out of the control block is provided at one end of the inclined plane pushing block, which is far away from the sliding block;

The multi-step moving assembly are provided on two sides of the positioning claw and the limiting claw respectively close to the upper parts of the positioning rack and the limiting rack, and are provided with two opposite inclined plane pushing blocks, and the inclined planes of the two inclined plane pushing blocks incline towards the middle parts of opposite positions;

The press strip extending out of the control block is provided at one end of each inclined plane pushing block, which is far away from the corresponding sliding block;

The single-step moving assembly and the multi-step moving assembly are respectively provided with return springs, and the return spring is provided in contact between the single-step moving assembly and the control block, and between the multi-step moving assembly and the control block.

Further, the movable encoding mechanism further comprises the first arc-shaped elastic sheet, and the first arc-shaped elastic sheet is connected with the connecting plate through a supporting plate, wherein the supporting plate is provided between the installation cylinder and the encoding groove; one arc-shaped tail end of the first arc-shaped elastic sheet extends into the encoding groove, and the other arc-shaped tail end of the first arc-shaped elastic sheet is provided close to the installation cylinder;

The movable encoding mechanism further comprises the second arc-shaped elastic sheet, one end of the second arc-shaped elastic sheet is provided in connection with the control block, and the arc-shaped tail end of the second arc-shaped elastic sheet extends into the encoding groove.

Further, the first arc-shaped elastic sheet is provided with the cutting-off groove close to the arc-shaped tail end of the installation cylinder, and the length direction of the cutting-off groove is parallel to the length direction of the encoding groove; the cutting-off blade is provided in the cutting-off groove, and one end of the cutting-off blade, which is close to the connecting plate, is provided in connection to the tail end of the inclined plane block, and the farther the inclined plane of the inclined plane block is away from the cutting-off blade, the higher the inclined plane is;

The supporting plate is also provided with a vertical driving groove, and the driving plate is provided on the driving groove; one end of the driving plate extends to the position below the contact plate through the open groove of one side of the encoding groove, and the other end of the driving plate is connected and matched with the inclined surface of the inclined plane block through the driving column;

The width of the driving plate is larger than that of the driving groove, and limiting grooves are provided on the two sides of the driving plate, and the minimum distance between the two limiting grooves is equal to the width of the driving groove;

The high end of the inclined plane block is provided with the reset spring, and one end of the reset spring, which is far away from the inclined plane block, is relatively fixed with the connecting plate, and one end of the reset spring, which is close to the inclined plane block, is fixedly connected with the inclined plane block.

Further, the first arc-shaped elastic sheet is provided with the press roll at the arc-shaped tail end close to the installation cylinder, and the press roll is provided on the supporting shaft in a penetrating mode, and one end of the supporting shaft is provided on the connecting plate through the connecting column;

The press roll is provided in elastic contact with the tail end of the first arc-shaped elastic sheet;

The surface of the press roll is provided with a release layer.

Further, the surface of the first arc-shaped elastic sheet is provided with the electrostatic generation layer;

The surface of the second arc-shaped elastic sheet is provided with the electrostatic generation layer.

Further, the supporting column is provided at one tail end of the installation cylinder; The length of the installation cylinder is equal to the width of the plurality of ink ribbon spools;

One end of the installation cylinder, which is far away from the supporting column, is provided with the thread groove, and the fixing nut is in screw-thread fit with the thread groove;

The fixing spring is provided on the installation cylinder in the penetrating mode and is provided between the ink ribbon spools after being mounted and the fixing nut.

Further, indication scales are further provided on one side of the sliding rail, and the scales of the indication scales are provided in corresponding to the positioning teeth in sequence one by one;

The control block is provided with the indication mark pointing to the indication scale.

The invention further provides a classification filing system, comprising the above bill binding and encoding device.

Compared to the prior arts, the invention has the following advantages and beneficial effects:

The moving positions of the ink ribbons are controlled by the movable encoding mechanism, enabling the quick encoding of the bill book, and attaching the ink ribbon spools to the binding side of the bill by pressing the bill to one side of the contact plate, placing the bound bill book in the order of the code afterwards to guarantee that the required bill book of a time period can be found quickly in the subsequent searching and management, and the corresponding position of the bill book to be placed can be found quickly.

4. BRIEF DESCRIPTION OF ACCOMPANY DRAWINGS

Figure 1:
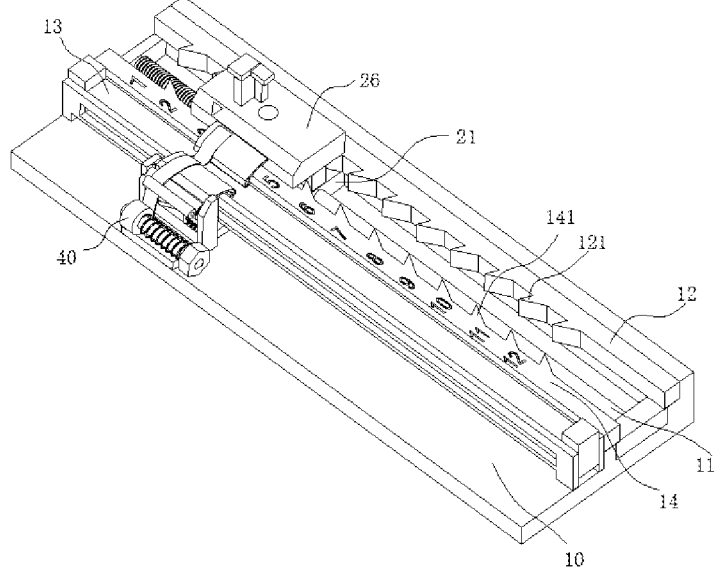
FIG. 1 is a schematic diagram showing the structure of a bill binding and encoding device provided by the invention.

In the figures, 10. the bottom plate; 11. the sliding rail; 111. the shift spring; 12. the positioning rack; 121. the positioning teeth; 13. the encoding groove; 131. the contact plate; 132. the bottom plate of the encoding groove; 133. the supporting spring; 14. the limiting rack; 141. the limiting teeth; 15. the indication scales; 20. the movable encoding mechanism; 21 the sliding block; the rotating shaft; 22. the positioning claw; 221. the limiting strip; 222. the positioning spring; 23. the connecting plate; 24. the installation cylinder; 241. the supporting column; 242. the fixing nut; 243. the fixing spring; 25. the limiting claw; 251. the limiting protrusion; 252. the limiting spring; 26. the control block; 261. the indication mark; 271. the single-step moving assembly; 272. the multi-step moving assembly; 273. the inclined plane pushing block; 274. the press strips; 275. the return spring;

31. the first arc-shaped elastic sheet; 311. the electrostatic generation layer; 312. the cutting-off groove; 32. the supporting plate; 321. the driving groove; 33. the second arc-shaped elastic sheet; 34. the cutting-off blade; 341. the inclined plane block; 35. the driving plate; 351. the limiting groove; 352. the driving column; 353. the reset spring; 36. the press roll; 361. the supporting shaft; 362. the connecting column; 40. the ink ribbon spools; 41. the ink ribbons; 50. the bill book.

5. SPECIFIC EMBODIMENT OF THE INVENTION

A further detailed description of the invention is given below in combination with the accompanying drawings and embodiments provided by the invention.

Referring to the FIG. 1 to FIG. 16, the invention provides a bill binding and encoding device, comprising: bottom plate 10, the movable encoding mechanism 20 and the ink ribbon spools 40, wherein the sliding rail 11 is provided on the bottom plate 10, the movable encoding mechanism 20 is provided with the sliding block 21, and the sliding block 21 is provided in the sliding rail 11; the sliding rail 11 is in concave shape and the sliding block 21 is in rectangular shape.

For the situation that the existing bills are difficult to manage and search after being bound into a book, the bill binding and encoding device provided by the application has the advantages that through the movable encoding mechanism 20 to drive the ink ribbon spools 40 to move relative to the bottom plate 10; the position of the ink ribbon spools 40 can move to different heights on the binding side of the bills; the bills are sorted according to the binding time periods of the same type of bills, for example, the bills can move to 12 positions according to the month sequence, with the positions corresponding to different sequence heights respectively; the ink ribbons 41 are moved to the time period corresponding to the bill to be encoded by controlling the position of the movable encoding mechanism 20; then the ink ribbons 41 of the ink ribbon spools 40 is pulled open, and the ink ribbons 41 is attached to the binding side of the bills after pressing the bills, and then the bills in different time periods are placed according to the attaching height of the ink ribbons 41. Referring to the FIG. 15, the required bill book 50 of a time period can be found quickly in the subsequent searching and management, and the corresponding position of the bill book to be placed can be found quickly.

The ink ribbon spools 40 can adopt the existing-colored tape, and different colored ink ribbons can be used to distinguish different document types or years.

Wherein the positioning rack 12 is provided on one side of the sliding rail 11, and a plurality of positioning teeth 121 are provided on the positioning rack 12 along the length direction of the sliding rail 11; the sliding block 21 is provided with the positioning claw 22 which is provided in rotational connection with the sliding block 21 through the rotating shaft 211; the positioning claw 22 is provided with a hook part which is respectively buckled and positioned with the positioning teeth 121 of the positioning rack 12.

the positioning teeth 121 on the positioning rack 12 are provided for determining the moving distance of the movable encoding mechanism 20, and the positioning claw 22 hooks on the positioning teeth 121 to ensure each accurate moving distance of the movable encoding mechanism.

The positioning claw 22 can be rotated away from the positioning teeth 121 when moving, and then to pull the movable encoding mechanism 20, and when the movable encoding mechanism 20 is moved to the required position, the positioning tooth 121 is rotated to be buckled with the next positioning tooth 121.

The encoding groove 13 is provided on the one side of the sliding groove, and the length direction of the encoding groove 13 is parallel to the length direction of the sliding rail 11; the contact plate 131 is provided in the encoding groove 13, and the supporting spring 133 is provided between the contact plate 131 and the bottom plate of the encoding groove 132.

When the ink ribbons 41 are attached to the bill book 50, the ink ribbons 41 are firstly pulled out from the ink ribbon spools 40, and is placed above the encoding groove 13; the side with the adhesive is place above, and the side without the adhesive is contacted with the contact plate 131, and then the bound bill book is contact with the contact plate 131; the bill book 50 is pressed downwards, to ensure the contact plate 131 overcomes the tension of the supporting spring 133, and let the bill book 50 to enter the encoding groove 13 by moving downwards, with the ink ribbon 41 extruded and attached to the bill book 50 by the two side walls of the encoding groove 13.

The two ends of the encoding groove 13 can be provided with the limiting blocks for positioning the bill book 50.

One side of the sliding block 21 is provided with the connecting plate 23 and the connecting plate 23 passes through the lower part of the bottom plate of the encoding groove 132.

One end of the connecting plate 23, which is far away from the sliding block 21, is provided with an installation cylinder 24 for installing the ink ribbon spools 40, and the axis of the installation cylinder 24 is parallel to the length direction of the encoding groove 13.

The installation cylinder 24 installed thereon is driven by the connecting plate 23 to move synchronously, which means that the positions of the ink ribbon spools 40 change simultaneously with the movement of the sliding block 21 for position encoding.

The connecting plate 23 passes under the bottom plate of the encoding groove 132, to guarantee that the connecting plate 23 does not affect the operation of the encoding groove 13 when moving.

Referring to the FIG. 1 to FIG. 6, further, the shift spring 111 is provided between one end face of the sliding block 21 and one end face of the sliding rail 11, and the shift spring 111 always remained in the compressed state; the shift spring 111 consistently drives the sliding block 21 toward the end away from the connection surface of the shift spring 111.

Preferably, the shift spring 111 and the sliding block 21 can be penetrated on an optical shaft to limit the swing and bend of the shift spring 111 when performing the ultimate compression of the shift spring 111 to avoid the failure of the shift spring 111.

The limiting rack 14 is provided on the other side of the sliding rail 11 relative to the positioning rack 12, and the limiting rack 14 is provided with a plurality of limiting teeth 141 along the length of the sliding rail 11; the limiting teeth 141 and the positioning rack 121 are provided in a staggered position in the length direction of the slide; the limiting claw 25 is also provided on the rotating shaft 211, and the limiting claw 25 is provided with a hook part which is respectively buckled and limited with the limiting teeth 141 of the limiting rack 14;

The rotating shaft 211 is provided with a positioning spring 222 in a penetrating mode, wherein one end of the positioning spring 222 is fixed relative to the rotating shaft 211 and the other end of the positioning spring 222 is fixed to the positioning claw 22, wherein the positioning spring 222 provides a force for the positioning claw 22 to rotate towards the side of the positioning rack 12.

The limiting spring 252 is further provided on the rotating shaft 211 in a penetrating mode, one end of the limiting spring 252 is connected with the positioning claw 22, the other end of the limiting spring 252 is connected with the limiting claw 25, and the limiting spring 252 provides a force for the limiting claw 25 to rotate towards one side of the limiting rack 14.

The positioning claw 22 is also provided with a limiting strip 221 at one side close to the limiting claw 25 in the axis direction of the rotating shaft 211, wherein the corresponding limiting claw 25 is provided with a limiting protrusion 251, and the limiting protrusion 251 is provided at one side close to the limiting claw 25 of the vertical axis of the rotating shaft 211, and the limiting strip 221 is provided at one side close to the positioning claw 22, of the vertical axis of the rotating shaft 221.

Figure 4:
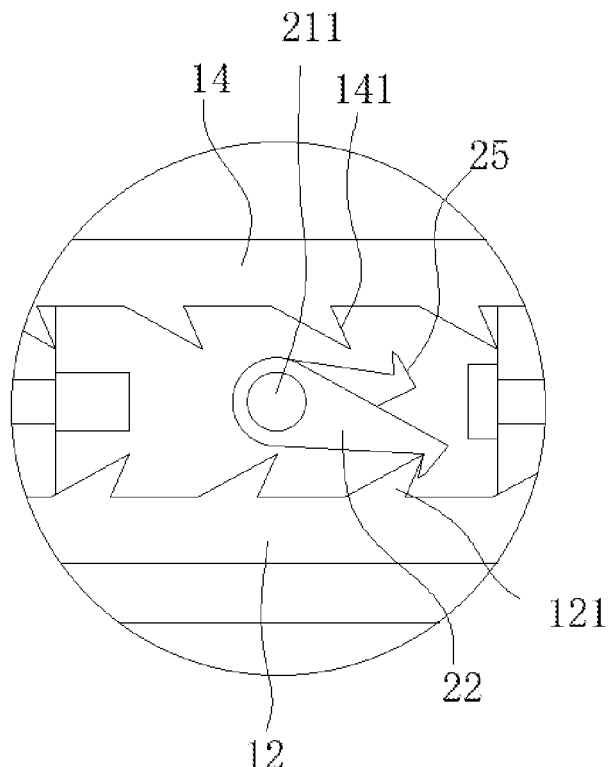
FIG. 4 is a schematic diagram showing the buckling of the positioning claw and the positioning teeth provided by the invention.
Figure 5:
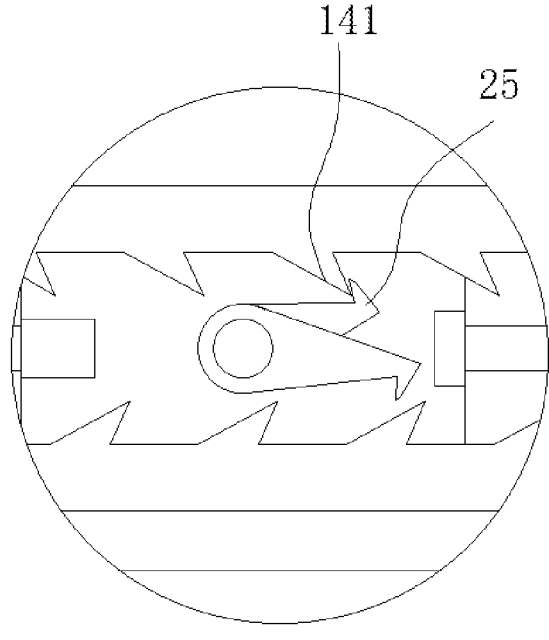
FIG. 5 is a schematic diagram showing the buckling of the limiting claw and the limiting teeth provided by the invention.

The cooperation of the positioning teeth 121 and the positioning claws 22 is provided to determine the position of the movable encoding mechanism 20, and the cooperation of the limiting teeth 141 and the limiting claws 25 is provided to duplicate the single-step movement of the movable encoding mechanism 20; when the movable encoding mechanism 20 is not moved, the positioning claws 22 are pushed by the positioning springs 222 to rotate towards one side of the positioning rack 12 to be buckled with the positioning teeth 121; referring to the FIG. 4, when the movable encoding mechanism 20 requires to move, which is when the movable encoding mechanism 20 moves from the previous positioning tooth to the next positioning tooth 121 at a time, the positioning claws 22 are pushed towards one end far away from the positioning teeth 121, and the limiting claws 25 at the other side enter the range buckled with the limiting teeth 141; however, because of the staggered positions of the positioning teeth 121 and the limiting teeth 141, the limiting claws 25 are not buckled with the limiting teeth 141 at this time, and after the positioning claws 22 are completely disengaged from the positioning teeth 121, the sliding block 21 moves under the pushing of the shifting springs 111, the limit pawl 25 and the limit teeth 141 are buckled to stop the limit of the sliding block 21; referring to FIG. 5, at this time, the positioning claw 22 is released from pushing the positioning claw 22, and the positioning claw 22 rotates to be matched with the positioning teeth 121 again under the pushing of the positioning spring 222, referring to the FIG. 4, to complete the single-step movement of the movable encoding mechanism 20. It is only necessary to push and release the positioning claw 22 during operation.

The cooperation of the limiting strip 221 and the limiting protrusion 251 enables the positioning claw 22 to drive the limiting claw 25 to rotate together and separate from the limiting rack 14 when it is transferred to be buckled with the positioning teeth 121.

The positioning teeth 121 and the limiting teeth 141 are both provided in a sawtooth shape, and the sawtooth-shaped tooth tips are provided towards the end face of the sliding rail 11 on one side of the shift spring 111; the control block 26 is provided fixedly at one end of the rotating shaft 211 away from the sliding block 21.

The saw tooth-shaped positioning teeth 121 limit the one-way movement of the positioning claw 22 and the limiting claw 25, and when the sliding block 21 is required to move toward the side provided with the shifting spring 111, the sliding block 21 is pushed directly toward the end provided with the shifting spring.

The tips of the positioning teeth 121 and the limiting teeth 141 are oriented toward the end face of the sliding rail 11 on the side attached to the shifting spring 111, and when moving toward this side, they cross the inclined planes of the positioning teeth 121 and the limiting teeth 141 without blocking the positioning claws 22 and the limiting claws 25.

Figure 6:
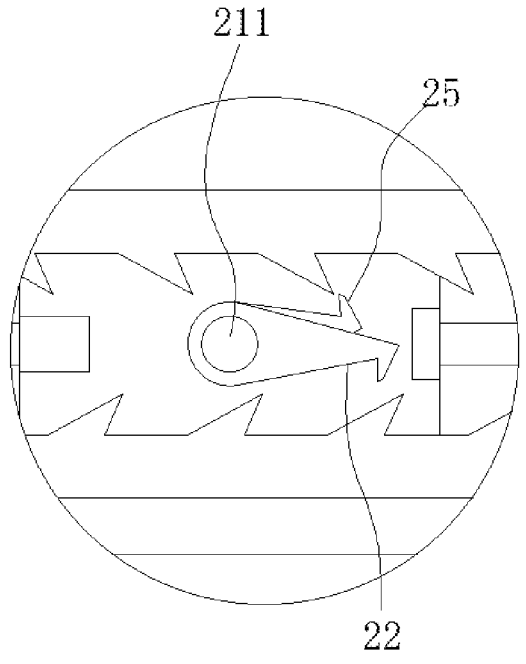
FIG. 6 is a schematic diagram showing the positioning claw and the limiting claw approaching each other provided by the invention.

The limiting spring 252 maintains contact between the limiting strip 221 and the limiting protrusion 251, keeping the positioning claw 22 and the limiting claw 25 departing and open, and when pushing the sliding block 21 to move, the positioning claw 22 and the limiting claw 25 overcoming the tension of the limiting spring 252 can come close to each other and cross the positioning teeth 121 and limiting teeth 141, referring to the FIG. 6.

Figure 7:
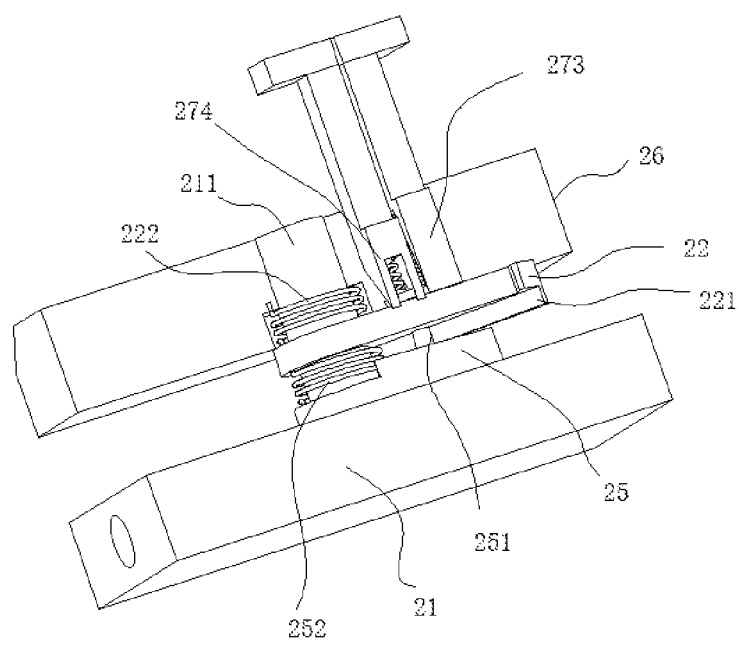
FIG. 7 is a schematic diagram showing a cross-section view of the control block provided by the invention.
Figure 8:
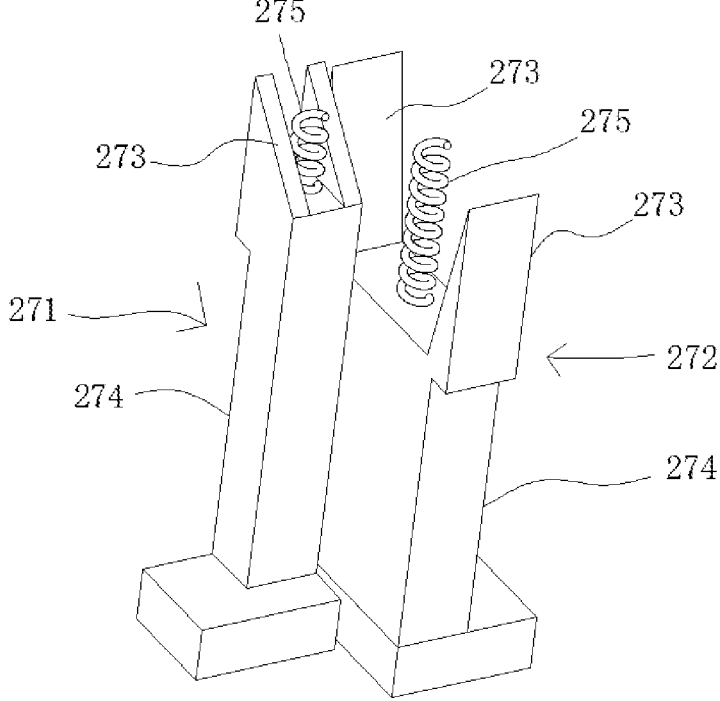
FIG. 8 is a schematic diagram showing the structure of the shift control assembly provided by the invention.

Referring to the FIG. 7 and FIG. 8, further, the movable encoding mechanism 20 further comprises the shift control assembly, and the shift control assembly is provided on the control block 26, and the shift control assembly comprises a single-step moving assembly 271 and a multi-step moving assembly 272.

The single-step moving assembly 271 is provided above one side close to the positioning rack 12 of the positioning claw 22 and is provided with an inclined plane pushing block 273, and the inclined plane of the inclined plane pushing block 273 inclines towards one side of the limiting rack 14; the press strip 274 extending out of the control block 26 is provided at one end of the inclined plane pushing block 273, which is far away from the sliding block 21.

To press the press strip 274 on the inclined plane pushing block 273 downward, making the inclined plane pushing block 273 move downward, and the inclined plane inclined toward the side of the limiting rack 14 pushes the positioning claw 22 toward the side away from the positioning teeth 121. Then releasing the press strip 274, the positioning claw 22 is rotated toward the end of the positioning teeth 121, to complete a single-step movement.

The multi-step moving assembly 272 are provided on two sides of the positioning claw 22 and the limiting claw 25 respectively close to the upper parts of the positioning rack 12 and the limiting rack 14, and are provided with two opposite inclined plane pushing blocks 273, and the inclined planes of the two inclined plane pushing blocks 273 incline towards the middle parts of opposite positions; the press strip 274 extending out of the control block 26 is provided at one end of each inclined plane pushing block 273, which is far away from the corresponding sliding block 21.

Pressing the press strip 274 above the two inclined plane pushing blocks 273, the two inclined plane pushing blocks 273 simultaneously bring the positioning claw 22 and the limiting claw 25 toward the middle; releasing the restriction on the movement of the sliding block 21, the sliding block 21 is pushed by the shifting spring 111 and moves toward the end away from the shifting spring 111, which can cross multiple positioning teeth 121 at a time.

When it has moved to the required position, the press on the press strip 274 is then released.

The press strip 274 can be provided in different sizes or shapes to facilitate differentiation between the single-step moving assembly 271 and the multi-step moving assembly 272 when pressing.

The single-step moving assembly 271 and the multi-step moving assembly 272 are respectively provided with return springs 275, and the return spring 275 is provided in contact between the single-step moving assembly 271 and the control block 26, and between the multi-step moving assembly 272 and the control block 26.

The return spring 275 provides the return force for the single-step moving assembly 271 and the multi-step moving assembly 272.

Figure 9:
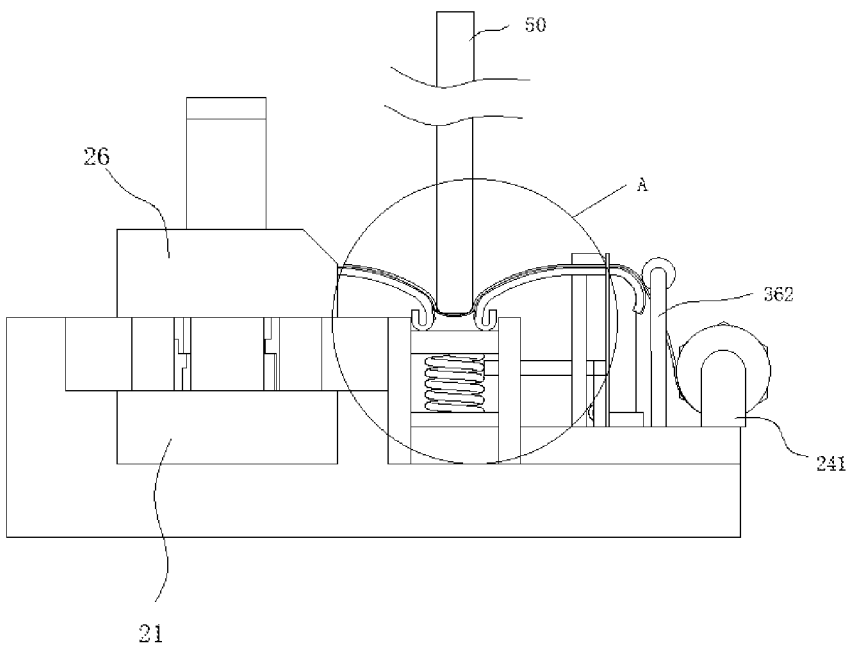
FIG. 9 is a schematic diagram showing a side view of the bill binding and encoding device provided by the invention.
Figure 10:
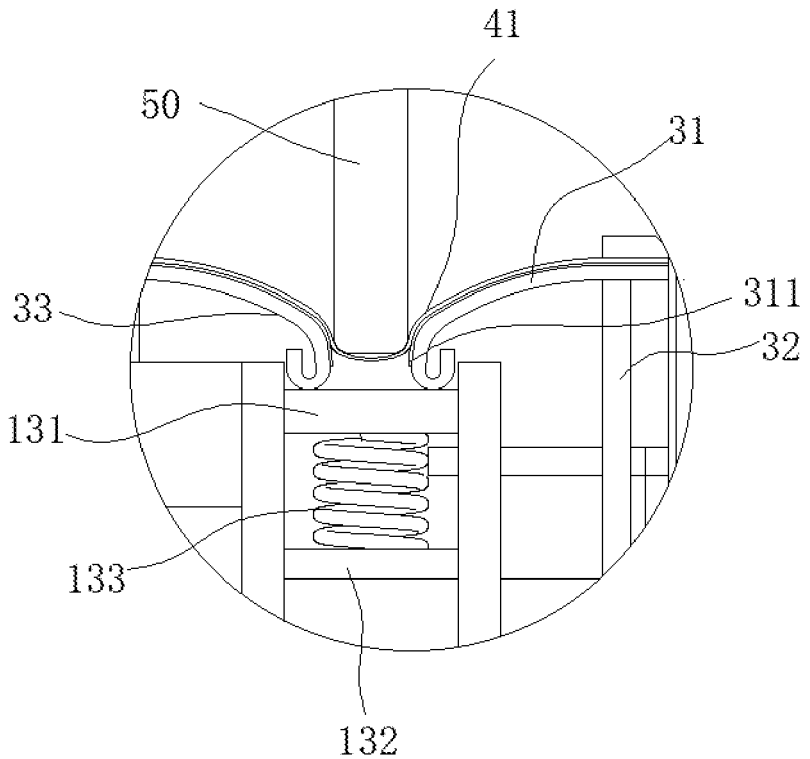
FIG. 10 is a schematic diagram showing a detail at A in FIG. 9.
Figure 11:
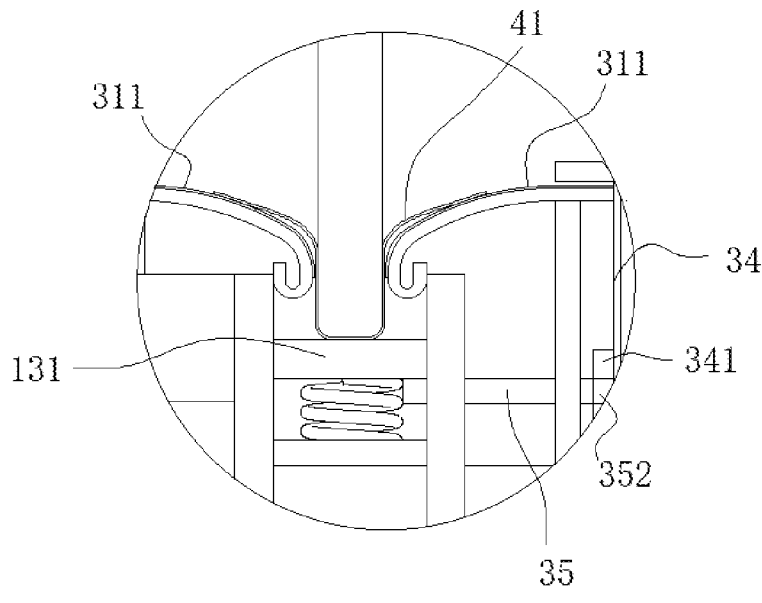
FIG. 11 is a schematic diagram showing the bill book under pressure.

Referring to the FIG. 9 to FIG. 11, further, the movable encoding mechanism 20 further comprises the first arc-shaped elastic sheet 31, and the first arc-shaped elastic sheet 31 is connected with the connecting plate 32 through a supporting plate 23, wherein the supporting plate 32 is provided between the installation cylinder 24 and the encoding groove 13; one arc-shaped tail end of the first arc-shaped elastic sheet 31 extends into the encoding groove 13, and the other arc-shaped tail end of the first arc-shaped elastic sheet 31 is provided close to the installation cylinder 24.

The movable encoding mechanism 20 further comprises the second arc-shaped elastic sheet 33, one end of the second arc-shaped elastic sheet 33 is provided in connection with the control block 26, and the arc-shaped tail end of the second arc-shaped elastic sheet 33 extends into the encoding groove 13.

The first arc-shaped elastic sheet 31 and the second arc-shaped elastic sheet 33 both have an end extending into the encoding groove 13, and the two arc-shaped elastic sheets squeeze the ink ribbons 41 toward the bill book 50 when pressing the bill book 50 downward, which can be adopted for squeezing the bill book 50 of many different thicknesses, and the thickness of the bill book 50 is not limited by the thickness of the encoding groove 13.

The pull-out ink ribbons 41 can be placed directly on top of the first arc-shaped elastic sheet 31 and the second arc-shaped elastic sheet 33, without contact between encoding groove 13, and there will be no interference between the moving ink ribbons 41 and encoding groove 13 when movable encoding mechanism 20 to shift.

Figure 12:
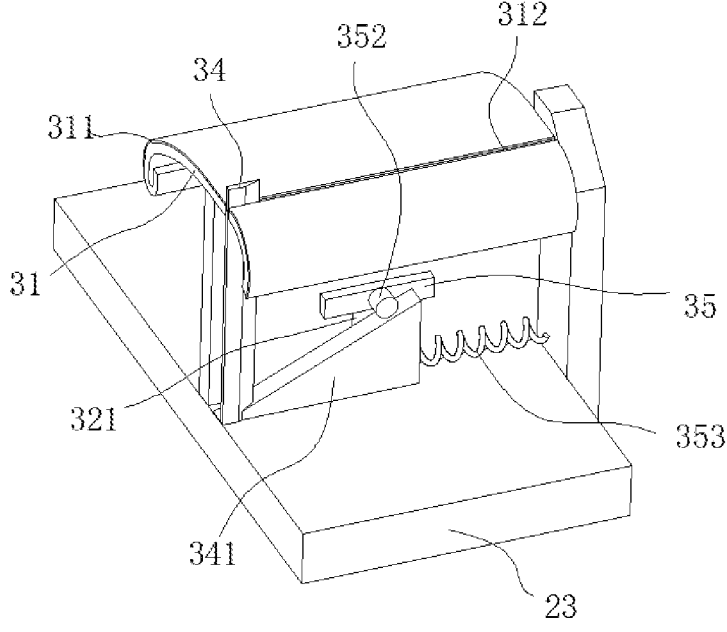
FIG. 12 is a schematic diagram showing the structure of the cutting-off blade provided by the invention.
Figure 13:
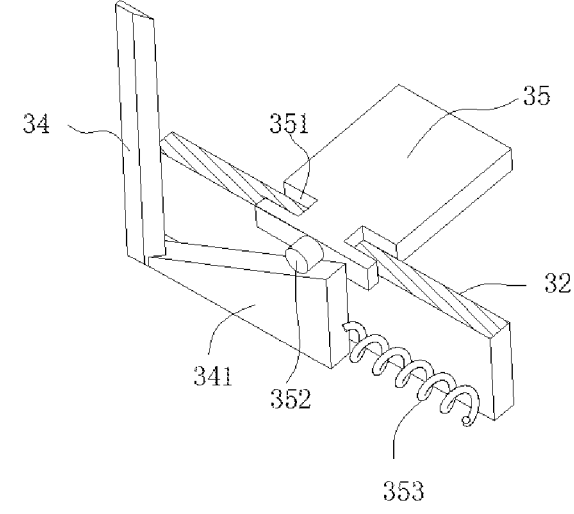
FIG. 13 is a schematic diagram showing a cross-section view of the supporting plate provided by the invention.

Referring to the FIG. 12, further, the first arc-shaped elastic sheet 31 is provided with the cutting-off groove 312 close to the arc-shaped tail end of the installation cylinder 24, and the length direction of the cutting-off groove 312 is parallel to the length direction of the encoding groove 13; the cutting-off blade 34 is provided in the cutting-off groove 312, and one end of the cutting-off blade 34, which is close to the connecting plate 23, is provided in connection to the tail end of the inclined plane block 341, and the farther the inclined plane of the inclined plane block 341 is away from the cutting-off blade 34, the higher the inclined plane is; the supporting plate 32 is also provided with a vertical driving groove 321, and the driving plate 321 is provided on the driving groove 35; one end of the driving plate 35 extends to the position below the contact plate 131 through the open groove of one side of the encoding groove 13, and the other end of the driving plate 35 is connected and matched with the inclined surface of the inclined plane block 341 through the driving column 352; The driving column 352 is a circular column.

The width of the driving plate 35 is larger than that of the driving groove 321, and limiting grooves 351 are provided on the two sides of the driving plate 35, and the minimum distance between the two limiting grooves 351 is equal to the width of the driving groove 321.

The high end of the inclined plane block 341 is provided with the reset spring 353, and one end of the reset spring 353, which is far away from the inclined plane block 341, is relatively fixed with the connecting plate 23, and one end of the reset spring 353, which is close to the inclined plane block 341, is fixedly connected with the inclined plane block 341.

The downward movement of the contact plate 131 drives the driving plate 35 downward together, and the contact with the inclined plane block 341 drives the column 352 to squeeze the inclined plane block 341, forcing the inclined plane block 341 to move, driving the cutting-off blade 34 to move in the cutting-off groove 312, cutting off the ink ribbons 41 above the cutting-off groove 312.

The ink ribbons 41 are cut off while pressing the tape, eliminating the need for a redundant ribbon-cutting step.

The limiting grooves 351 provided on both sides of the driving plate 35 limit the movement of the driving plate 35 in the direction of the opening of the driving groove 321, while several sides of the driving groove 321 are in contact with the side surfaces of the supporting plate 32 to limit the deflection of the driving plate 35.

The reset spring 353 pushes the inclined plane block 341 toward the end away from the reset spring 353 after the driving plate 35 rises to bring the cutting-off blade 34 into position.

On both sides of the connecting plate 23 can be provided with a block to fix the reset spring 353 and to install the first arc-shaped elastic sheet 31 after cutting the cutting-off groove 312, and the cutting-off groove 312 may also not completely penetrate the length direction of the first arc-shaped elastic sheet 31 to keep the connection of the first arc-shaped elastic sheet 31.

Figure 3:
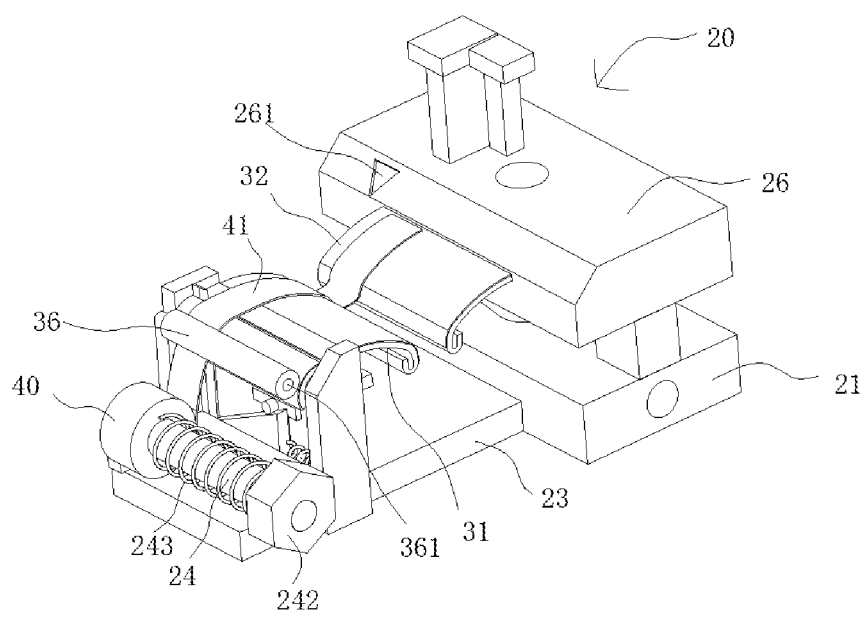
FIG. 3 is a schematic diagram showing the structure of the movable encoding mechanism provided by the invention.

Referring to the FIG. 3, further, the first arc-shaped elastic sheet 31 is provided with the press roll 36 at the arc-shaped tail end close to the installation cylinder 24, and the press roll 36 is provided on the supporting shaft 361 in a penetrating mode, and one end of the supporting shaft 361 is provided on the connecting plate 23 through the connecting column 362; the press roll 36 is provided in elastic contact with the tail end of the first arc-shaped elastic sheet 31.

The ink ribbons 41 pulled out from the ink ribbon spool 40 passes between the end of the press roll 36 and the first arc-shaped elastic sheet 31 before being placed on top of the cutting-off groove 312; after cutting off the ink ribbons 41 when attaching the ink ribbons 41, the pulled-out end of the ink ribbons 41 are fixed to keep the pulled-out end of the ink ribbons 41 from returning to the ink ribbon spools 40. It is possible to pull the exposed end of the ink ribbons 41 directly when being used next time, avoiding the time consumption of finding the end.

The surface of the press roll 36 has a release layer. The release layer is a release paper or a release film provided on the surface of the press roll 36. Since the adhesive surface of the ink ribbons 41 are in contact with the press roll 36 when the ribbons 41 are pulled, providing the release layer on the surface of the press roll 36 can prevent the ink ribbons 41 from sticking to the press roll 36, resulting in difficulty in pulling and destruction of the adhesion.

One end of the press roll 36 is fixed and the other end is unlocked, so that the ink ribbon 41 can be inserted from the unlocked end when the ink ribbon 41 is put in for the first time.

Referring to the FIG. 10 to FIG. 12, further, the surface of the first arc-shaped elastic sheet 31 is provided with the electrostatic generation layer 311; and the surface of the second arc-shaped elastic sheet 33 is provided with the electrostatic generation layer 311.

The electrostatic generating layer 311 is provided for generating static electricity by friction between the ink ribbons 41 and the electrostatic generating layer 311 when pulling and moving the ink ribbon 41, and the generated static electricity can cause the smooth surface of the ink ribbons 41 to attach to the first arc-shaped elastic sheet 31 and the second arc-shaped elastic sheet 33, shaping the ink ribbons 41 pulled out to prevent the ink ribbons 41 from being arched. Thereby, when pressing the bill book 50 into the encoding groove 13, the ink ribbons 41 can be attached to the bill book 50 in a predetermined position.

Figure 14:
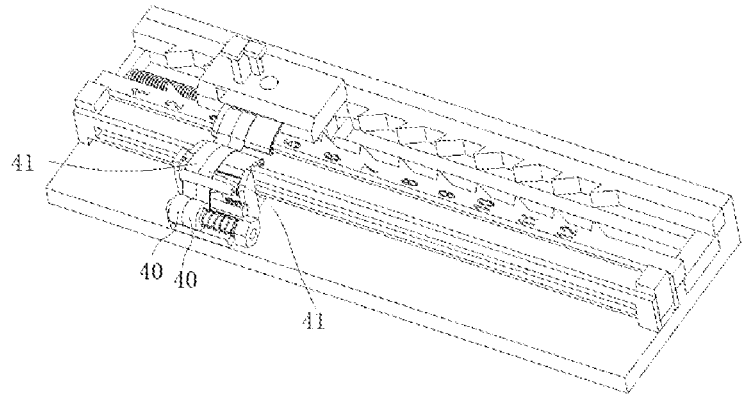
FIG. 14 is a schematic diagram showing the installation of a plurality of ink ribbon spools on an installation cylinder.
Figure 15:
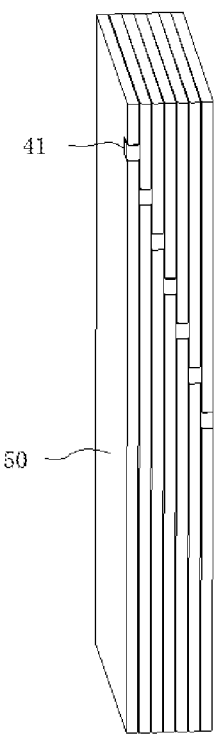
FIG. 15 is a schematic diagram showing the sequential placement of the bill book after being encoded.

Referring to the FIG. 3 and FIG. 14, further, the supporting column 241 is provided at one tail end of the installation cylinder 24; the length of the installation cylinder 24 is equal to the width of the plurality of ink ribbon spools 40; one end of the installation cylinder 24, which is far away from the supporting column 241, is provided with the thread groove, and the fixing nut 242 is in screw-thread fit with the thread groove; the fixing spring 243 is provided on the installation cylinder 24 in the penetrating mode and is provided between the ink ribbon spools 40 after being mounted and the fixing nut 242.

Figure 16:
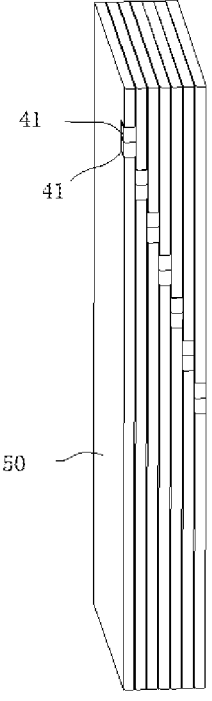
FIG. 16 is a schematic diagram showing the sequential placement of the bill book after being encoded with multiple ink ribbons.

When encoding, multiple colored ink ribbons 41 can be applied for deeper encoding, such as one color for the year plus one color for the month, and one color for the type plus one or more colors for the time period, as referring to the FIG. 16.

The installation cylinder 24 can be installed with a variety of colored ink ribbons 41 for encoding. When installing or replacing the ink ribbons 41, removing the fixing nut 242 and fixing spring 243, then installing one or more kinds of ink ribbons 41, then installing the fixing spring 243 and fixing nut 242 in turn, and the fixing spring 243 is arranged tightly with the ink ribbons 41.

Figure 2:
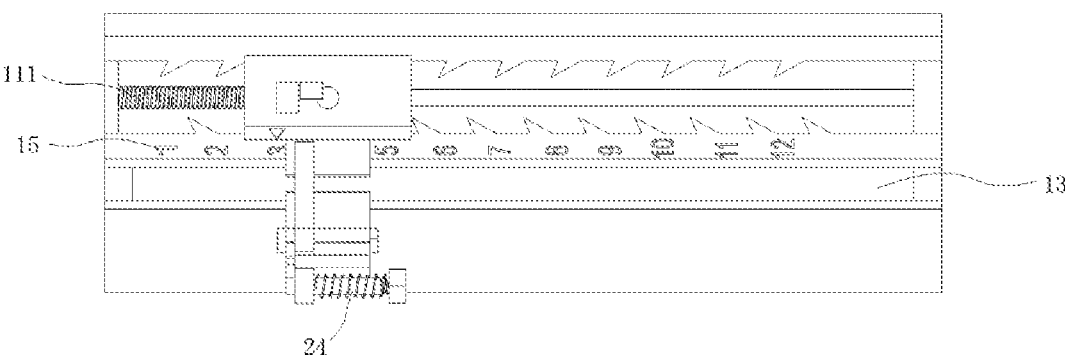
FIG. 2 is a schematic diagram showing a top view of FIG. 1.

Referring to the FIG. 2 and FIG. 3, further, indication scales 15 are further provided on one side of the sliding rail 11, and the scales of the indication scales 15 are provided in corresponding to the positioning teeth 121 in sequence one by one; the control block 26 is provided with the indication mark 261 pointing to the indication scale 15.

For example, when adopting the month for encoding, the indication scale 15 is set to 1-12, and moving the sliding block 21 to move the indication mark 261 to the selected indication scale 15, which means the numbering of that position on the bill book 50.

The invention further provides a classification filing system, comprising the above bill binding and encoding device.

By encoding the bound bill book 50 and then classifying and filing the encoded bill book 50, the invention allows the quick finding and returning during subsequent administration.

In the specification of the present disclosure, it is to be understood that terms such as 'up', 'down', 'front', 'back', 'left', 'right', 'vertical', 'horizontal', 'center', 'top', 'bottom', 'in', 'out', 'inside', 'outside', 'periphery', refer to the orientations and location relations which are the orientations and location relations illustrated in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure. The 'inside' refers to the interior or enclosed area or space, and the 'periphery' is the area around a particular part or a particular area.

In addition, terms such as 'first', 'second', 'third', 'fourth' are used herein for purposes of description and are not intended to indicate or imply relative importance or significance or to imply the number of indicated technical features. Thus, the feature defined with 'first', 'second', 'third', 'fourth' may comprise one or more of this feature. In the description of the present disclosure, 'a plurality of' means two or more than two, unless specified otherwise.

In the descriptions of the disclosure, it should be noted that, unless otherwise specified or defined, the terms such as 'mount', 'provide', 'arrange' 'connect', and 'assemble' should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediary, or internal communication between two components or mutual interaction relationship between two components. The specific meanings of the above terms in the disclosure may be understood according to specific circumstances for a person of ordinary skill in the art.

In the description of embodiments provided by the invention, specific features, structures, materials, or characteristics may be combined in any one or more embodiments or examples in a suitable manner.

In the description of embodiments provided by the invention, it should be understood that '-' and '~' indicate a range between two values, and that the range includes endpoints. For instance, 'A-B' denotes a range greater than or equal to A and less than or equal to B. 'A~B' denotes a range greater than or equal to A and less than or equal to B.

The invention and the embodiments thereof are described hereinabove, and this description is not restrictive. What is shown above is only the principles and the preferred embodiments of the invention, and the actual structure is not limited thereto. In summary, multiple variations, modifications, substitutions and alterations made by using the specifications and the attaching drawings of the invention, or direct or indirect applications to other related technical fields, shall all fall within the protection scope of the invention, and the scope of which is defined by the claims and their equivalents.

The invention claimed is:

1. A bill binding and encoding device, wherein the device comprises a bottom plate, a movable encoding mechanism and colored ribbon spools, wherein a sliding rail is provided on the bottom plate, the movable encoding mechanism is provided with a sliding block, and the sliding block is provided in the sliding rail;

wherein a positioning rack is provided on one side of the sliding rail, and a plurality of positioning teeth are provided on the positioning rack along a length direction of the sliding rail;

wherein the sliding block is provided with a positioning claw which is provided in rotational connection with the sliding block through a rotating shaft;

the positioning claw is provided with a hook part which is respectively buckled and positioned with the positioning teeth of the positioning rack;

an encoding groove is provided on one side of the sliding groove, and a length direction of the encoding groove is parallel to the length direction of the sliding rail;

a contact plate is provided in the encoding groove, and a supporting spring is provided between the contact plate and the bottom plate of the encoding groove;

one side of the sliding block is provided with a connecting plate and the connecting plate passes through a lower part of the bottom plate of the encoding groove;

one end of the connecting plate, which is far away from the sliding block, is provided with an installation cylinder for installing the colored ribbon spools, and axis of the installation cylinder is parallel to the length direction of the encoding groove.

2. The bill binding and encoding device according to claim 1, wherein:

a shift spring is provided between one end face of the sliding block and one end face of the sliding rail, and the shift spring always remained in the compressed state;

a limiting rack is provided on other side of the sliding rail relative to the positioning rack, and the limiting rack is provided with a plurality of limiting teeth along the length of the sliding rail;

the limiting teeth and the positioning rack are provided in a staggered position in the length direction of the sliding rail;

a limiting claw is also provided on the rotating shaft, and the limiting claw is provided with a hook part which is respectively buckled and limited with the limiting teeth of the limiting rack;

the rotating shaft is provided with a positioning spring in a penetrating mode, wherein one end of the positioning spring is fixed relative to the rotating shaft and other end of the positioning spring is fixed to the positioning claw, wherein the positioning spring provides a force for the positioning claw to rotate towards the side of the positioning rack;

the limiting spring is further provided on the rotating shaft in a penetrating mode, one end of the limiting spring is connected with the positioning claw, other end of the limiting spring is connected with the limiting claw, and the limiting spring provides a force for the limiting claw to rotate towards one side of the limiting rack;

the positioning claw is also provided with a limiting strip at one side close to the limiting claw in the axis direction of the rotating shaft, wherein the corresponding limiting claw is provided with a limiting protrusion, and the limiting protrusion is provided at one side close to the limiting claw of vertical axis of the rotating shaft, and the limiting strip is provided at one side close to the positioning claw, of the vertical axis of the rotating shaft;

the positioning teeth and the limiting teeth are both provided in a sawtooth shape, and a sawtooth-shaped tooth tips are provided towards the end face of the sliding rail on one side of the shift spring;

a control block is provided fixedly at one end of the rotating shaft away from the sliding block.

3. The bill binding and encoding device according to claim 2, wherein:

the movable encoding mechanism further comprises a shift control assembly, and the shift control assembly is provided on the control block, and the shift control assembly comprises a single-step moving assembly and a multi-step moving assembly;

the single-step moving assembly is provided above one side close to the positioning rack of the positioning claw and is provided with an inclined plane pushing block, and the inclined plane of the inclined plane pushing block inclines towards one side of the limiting rack;

press strips extending out of the control block are provided at one end of the inclined plane pushing block, which is far away from the sliding block;

the multi-step moving assembly are provided on two sides of the positioning claw and the limiting claw respectively close to the upper parts of the positioning rack and the limiting rack, and are provided with two opposite inclined plane pushing blocks, and inclined planes of the two inclined plane pushing blocks incline towards the middle parts of opposite positions;

the press strips extending out of the control block are provided at one end of each inclined plane pushing block, which is far away from the corresponding sliding block;

the single-step moving assembly and the multi-step moving assembly are respectively provided with return springs, and the return spring is provided in contact between the single-step moving assembly and the control block, and between the multi-step moving assembly and the control block.

4. The bill binding and encoding device according to claim 2, wherein:

a movable coding mechanism further comprises a first are-shaped elastic sheet, and the first arc-shaped elastic sheet is connected with the connecting plate through a supporting plate, wherein the supporting plate is provided between the installation cylinder and the encoding groove; one arc-shaped tail end of the first arc-shaped elastic sheet extends into the coding groove, and other arc-shaped tail end of the first arc-shaped elastic sheet is provided close to the installation cylinder;

the movable encoding mechanism further comprises the second arc-shaped elastic sheet, one end of the second arc-shaped elastic sheet is provided in connection with the control block, and the arc-shaped tail end of the second arc-shaped elastic sheet extends into the encoding groove.

5. The bill binding and encoding device according to claim 4, wherein:

the first arc-shaped elastic sheet is provided with a cutting-off groove close to the arc-shaped tail end of the installation cylinder, and a length direction of the cutting-off groove is parallel to the length direction of the encoding groove;

a cutting-off blade is provided in the cutting-off groove, and one end of the cutting-off blade, which is close to the connecting plate, is provided in connection to a tail end of an inclined plane block, and a farther the inclined plane of the inclined plane block is away from the cutting-off blade, the higher the inclined plane is;

the supporting plate is also provided with a vertical driving groove, and the driving plate is provided on the driving groove; one end of the driving plate extends to the position below the contact plate through an open groove of one side of the encoding groove, and other end of the driving plate is connected and matched with the inclined surface of the inclined plane block through a driving column;

a width of the driving plate is larger than that of the driving groove, and limiting grooves are provided on the two sides of the driving plate, and a minimum distance between the two limiting grooves is equal to a width of the driving groove;

a high end of the inclined plane block is provided with a reset spring, and one end of the reset spring, which is far away from the inclined plane block, is relatively fixed with the connecting plate, and one end of the reset spring, which is close to the inclined plane block, is fixedly connected with the inclined plane block.

6. The bill binding and encoding device according to claim 5, wherein:

the first arc-shaped elastic sheet is provided with a press roll at the arc-shaped tail end close to the installation cylinder, and the press roll is provided on the supporting shaft in a penetrating mode, and one end of the supporting shaft is provided on the connecting plate through the connecting column;

the press roll is provided in elastic contact with a tail end of the first arc-shaped elastic sheet;

a surface of the press roll is provided with a release layer.

7. The bill binding and encoding device according to claim 2, wherein:

indication scales are further provided on one side of the sliding rail, and scales of the indication scales are provided in corresponding to the positioning teeth in sequence one by one;

the control block is provided with an indication mark pointing to the indication scales.

8. The bill binding and encoding device according to claim 4, wherein:

a surface of the first arc-shaped elastic sheet is provided with an electrostatic generation layer;

a surface of the second arc-shaped elastic sheet is provided with the electrostatic generation layer.

9. The bill binding and encoding device according to claim 1, wherein:

the supporting column is provided at one tail end of the installation cylinder;

the length of the installation cylinder is equal to the width of the plurality of colored ribbon spools;

one end of the installation cylinder, which is far away from the supporting column, is provided with a thread groove, and a fixing nut is in screw-thread fit with the thread groove;

the fixing spring is provided on the installation cylinder in the penetrating mode and is provided between the colored ribbon spools after being mounted and the fixing nut.

10. A classification filing system wherein comprises the bill binding and encoding device according to claim 1.

* * * * *